United States Patent
Lin et al.

(10) Patent No.: US 11,474,526 B2
(45) Date of Patent: Oct. 18, 2022

(54) DISTANCE DETECTION METHOD AND DEVICE FOR CLEANING ROBOT, AND CLEANING ROBOT

(71) Applicant: MIDEA ROBOZONE TECHNOLOGY CO., LTD., Suzhou (CN)

(72) Inventors: Zhouxiong Lin, Suzhou (CN); Chuanluo Xu, Suzhou (CN); Ke Li, Suzhou (CN); Bingan Tan, Suzhou (CN); Chun Luan, Suzhou (CN)

(*) Notice: Subject to any disclaimer, the term of this patent is extended or adjusted under 35 U.S.C. 154(b) by 182 days.

(21) Appl. No.: 16/701,158

(22) Filed: Dec. 3, 2019

(65) Prior Publication Data
US 2020/0183404 A1    Jun. 11, 2020

(30) Foreign Application Priority Data
Dec. 7, 2018 (CN) .......................... 201811495536.X

(51) Int. Cl.
*G01C 22/00* (2006.01)
*G05D 1/00* (2006.01)
*G05D 1/02* (2020.01)

(52) U.S. Cl.
CPC .......... *G05D 1/0214* (2013.01); *G05D 1/0088* (2013.01); *G05D 2201/0203* (2013.01)

(58) Field of Classification Search
CPC .............. G05D 1/0214; G05D 1/0088; G05D 2201/0203
(Continued)

(56) References Cited

U.S. PATENT DOCUMENTS

2005/0251292 A1* 11/2005 Casey ................. G05D 1/0242
700/245
2007/0096676 A1* 5/2007 Im ....................... G05D 1/0242
318/587
(Continued)

FOREIGN PATENT DOCUMENTS

CN   105223951 A   1/2016
CN   106821157 A   6/2017
(Continued)

OTHER PUBLICATIONS

Search report for EP application 19214006.9.
(Continued)

*Primary Examiner* — Mahmoud S Ismail
(74) *Attorney, Agent, or Firm* — Kilpatrick Townsend & Stockton, LLP

(57) ABSTRACT

Provided are distance detection method and device for a cleaning robot, a cleaning robot, an electronic device and a non-transitory computer readable storage medium. The method includes: acquiring detection data of an obstacle detector of the cleaning robot, determining, according to the detection data, whether a distance between the cleaning robot and an obstacle reaches a first distance, where the first distance is a distance between the cleaning robot and the obstacle at a moment when a changing trend of the detection data fits a pre-set changing trend. In the embodiments of the present disclosure, whether the cleaning robot is moving to a specific position a certain distance away from the obstacle may be detected precisely. As the specific position is determined precisely, collision with obstacles can be avoided efficiently for the cleaning robot during working, and thus the distance detection method for the cleaning robot is improved.

19 Claims, 4 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2012/0065829 | A1* | 3/2012 | Yu | G05D 1/0227 |
| | | | | 701/23 |
| 2017/0309146 | A1* | 10/2017 | Mackenzie | G01S 13/003 |
| 2018/0178391 | A1* | 6/2018 | Naito | G05D 1/0219 |
| 2021/0059493 | A1* | 3/2021 | Watanabe | A47L 9/2805 |

FOREIGN PATENT DOCUMENTS

| | | |
|---|---|---|
| CN | 107450569 A | 12/2017 |
| CN | 109464075 A | 3/2019 |
| CN | 109567678 A | 4/2019 |
| GB | 582708 A | 11/1946 |
| JP | 2010099366 A | 5/2010 |

OTHER PUBLICATIONS

OA for CN application 201811495536.X.
Second OA for CN application No. 201811495536.X.
The Primary Study for Producing and Selecting the Path in Avoiding Obstacle Automatically.
Research on Psysicai Model Based Obstruction Avoiding Path Generation.

* cited by examiner

DISTANCE DETECTION METHOD AND DEVICE FOR CLEANING ROBOT, AND CLEANING ROBOT

CROSS-REFERENCES TO RELATED APPLICATIONS

The present application is based on and claims priority to Chinese patent application number 201811495536.X, filed on Dec. 7, 2018, the entire disclosure of which is hereby incorporated by reference.

FIELD

The present disclosure relates to a field of intelligent household electrical appliances, and particular to a distance detection method for a cleaning robot, a distance detection device for a cleaning robot, a cleaning robot, an electronic device and a non-transitory computer readable storage medium.

BACKGROUND

Currently, the cleaning robot can detect if there are obstacles in front of the cleaning robot in the moving direction, and if there are obstacles, the cleaning robot stops to avoid the obstacles. For most of the existing cleaning robots, a collision plate is arranged in front of the cleaning robot. As the existing cleaning robot cannot precisely detect a distance between the cleaning robot and the obstacle, the cleaning robot can only slows down when it detects an existence of the obstacle and stops until the collision plate is hit by the obstacle, which negatively affected the cleaning efficiency of the cleaning robot.

SUMMARY

The present disclosure seeks to solve at least one of the problems that exist in the related art to at least some extent.

Accordingly, embodiments of the present disclosure provide a distance detection method for a cleaning robot, which can precisely detect whether the cleaning robot is moving to a specific position a certain distance away from the obstacle. As the specific position is determined precisely, collision with obstacles can be avoided efficiently for the cleaning robot during working, and thus the distance detection method for the cleaning robot is improved.

Another embodiments of the present disclosure provides a distance detection method for a cleaning robot.

Still another embodiments of the present disclosure provides a cleaning robot.

A further embodiments of the present disclosure provides an electronic device.

A further embodiments of the present disclosure provides a non-transitory computer readable storage medium.

One embodiment of the present disclosure provides a distance detection method for a cleaning robot, including: acquiring detection data of an obstacle detector of the cleaning robot, determining, according to the detection data, whether a distance between the cleaning robot and an obstacle reaches a first distance, where the first distance is a distance between the cleaning robot and the obstacle at a moment when a changing trend of the detection data fits a pre-set changing trend.

One embodiment of the present disclosure provides a distance detection device for a cleaning robot. Specifically, an obstacle detector is disposed at the cleaning robot and is configured to detect an obstacle; the obstacle detector is connected to the distance detection device.

The distance detection device includes: a detection data acquiring device, configured to acquire detection data of the obstacle detector of the cleaning robot, a determining device, configured to determine, according to the detection data, whether a distance between the cleaning robot and an obstacle reaches a first distance, where the first distance is a distance between the cleaning robot and the obstacle at a moment when a changing trend of the detection data fits in a pre-set changing trend.

With the distance detection device for a cleaning robot provided in the embodiments of the second aspect of the present disclosure, it can be precisely detected whether the cleaning robot is moving to a specific position a certain distance away from the obstacle. As the specific position is determined precisely, collision with obstacles can be avoided efficiently for the cleaning robot during working, and thus the distance detection device for the cleaning robot is improved.

One embodiment of the present disclosure provides a cleaning robot. An obstacle detector, a cleaning device and a distance detection device as described in the embodiments of the present disclosure are disposed at the cleaning robot, where the obstacle detector is connected to the cleaning device and the distance detection device, and the distance detection device is connected to the cleaning device; where the obstacle detector is configured to detect an obstacle, and the cleaning device is configured to perform a cleaning operation.

With the cleaning robot provided in the embodiments of the present disclosure, it can be precisely detected whether the cleaning robot is moving to a specific position a certain distance away from the obstacle. As the specific position is determined precisely, collision with obstacles can be avoided efficiently for the cleaning robot during working, and thus the distance detection method for the cleaning robot is improved.

One embodiment of the present disclosure provides an electronic device, including: a memory, a processor; where the processor reads an executable program code stored in the memory to execute a program corresponding to the executable program code, to perform a distance detection method for a cleaning robot as described in the embodiments of the first aspect of the present disclosure.

One embodiment of the present disclosure provides a non-transitory computer readable storage medium having stored therein a computer program that, when executed by a processor, causes the processor to perform a distance detection method for a cleaning robot as described in the embodiments of the first aspect of the present disclosure.

BRIEF DESCRIPTION OF THE DRAWINGS

Embodiments of the present disclosure will become apparent and more readily appreciated from the following descriptions made with reference to the drawings, in which.

DETAILED DESCRIPTION OF THE INVENTION

Exemplary embodiments will be described in detail herein, and examples thereof are illustrated in accompanying drawings. Throughout figures referred by the following description, the same reference number in different figures indicates the same or similar elements. The embodiments described herein with reference to drawings are explanatory, and used to generally describe the present disclosure, which shall not be construed to limit the present disclosure.

A distance detection method for a cleaning robot, a distance detection device for a cleaning robot, a cleaning robot, an electronic device and a non-transitory computer readable storage medium according to embodiments of the present disclosure are described below with reference to the drawings.

Figure 1:
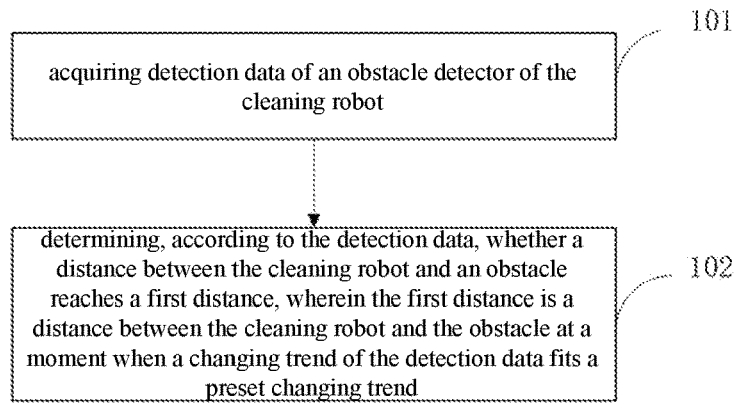
FIG. 1 is a flow chart of a distance detection method for a cleaning robot according to an embodiment of the present disclosure.

FIG. 1 is a flow chart of a distance detection method for a cleaning robot according to an embodiment of the present disclosure. As shown in FIG. 1, the method includes following steps.

In block 101, detection data of an obstacle detector of the cleaning robot is acquired.

In the embodiments of the present disclosure, in order to prevent the cleaning robot from colliding with an obstacle and being damaged, the obstacle detector is disposed at the cleaning robot.

According to a driving direction of the cleaning robot with respect to the obstacle, the cleaning robot may have a variety of obstacle detector arrangements as follows.

Figure 2:
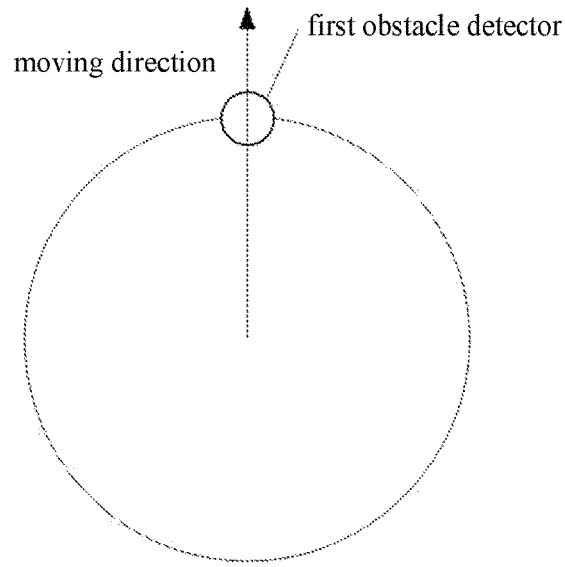
FIG. 2 is a schematic diagram of a cleaning robot provided with only a first obstacle detector according to an embodiment of the present disclosure.

Alternatively, when the moving direction of the cleaning robot is perpendicular to the contour line of the obstacle or a tangent line thereof, or an angle between the moving direction and the obstacle is an acute angle which is relatively large, in this case the obstacle detector disposed at the cleaning robot may include a first obstacle detector. As shown in FIG. 2, an obstacle detection function of the cleaning robot can be realized by the first obstacle detector disposed at the cleaning robot only. Specifically, the first obstacle detector is disposed at a forward end of the cleaning robot, and a scanning direction thereof is consistent with the moving direction of the cleaning robot. A detection range of the first obstacle detector is a certain area where the moving direction is regarded as a central axis of the area, and obstacles in this area can be detected.

Figure 3:
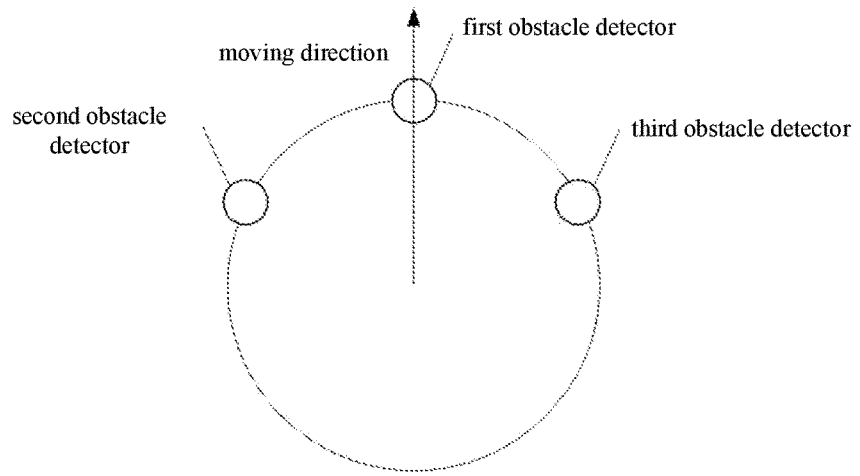
FIG. 3 is a schematic diagram of a cleaning robot provided with a first obstacle detector, a second obstacle detector and a third obstacle detector according to an embodiment of the present disclosure.

It can be known from the above that the first obstacle detector can only detect a limited area in the moving direction of the cleaning robot. When the moving direction of the cleaning robot is not perpendicular to the obstacle surface or the acute angle between the moving direction of the cleaning robot and the obstacle is relatively small, the first obstacle detector disposed at the forward end of the cleaning robot cannot detect the obstacle before collision, or the first obstacle detector may detect the presence of the obstacle too late to stop the cleaning robot before the collision. Further, the obstacle detector disposed at the cleaning robot should include a second obstacle detector and a third obstacle detector which are symmetrically disposed at two sides of a body of the cleaning robot, as shown in FIG. 3. Obstacles in a detection blind zone of the first obstacle detector may be detected by the second obstacle detector and the third obstacle detector, which ensures that all the obstacles that may collide with the cleaning robot in the moving direction or at both sides of the moving direction can be detected during moving.

Figure 4:
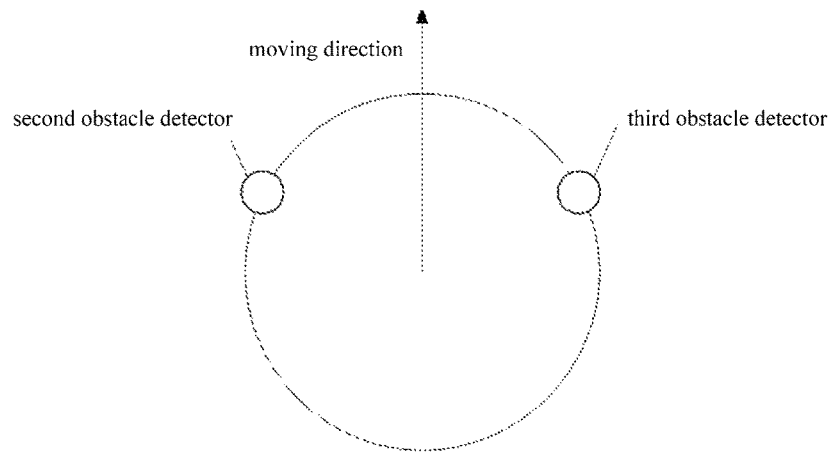
FIG. 4 is a schematic diagram of a cleaning robot provided with only a second obstacle detector and a third obstacle detector according to an embodiment of the present disclosure.

Alternatively, the obstacle detector disposed at the cleaning robot may include a second obstacle detector and a third obstacle detector only. Specifically, the second obstacle detector and the third obstacle detector are symmetrically disposed at two sides of a body of the cleaning robot, and an angle between each detector and the moving direction is in a range of 0 to a, where a is from 45° to 90°, as shown in FIG. 4. In the case where only the second obstacle detector and the third obstacle detector are provided, all the obstacles that may collide with the cleaning robot in the moving direction or at both sides of the moving direction can be detected during moving.

When the cleaning robot is in a working state, the obstacle detector of the cleaning robot also remains working to detect whether there is an obstacle that may collide with the cleaning robot. When the obstacle is detected, detection data for the obstacle is acquired.

Figure 5:
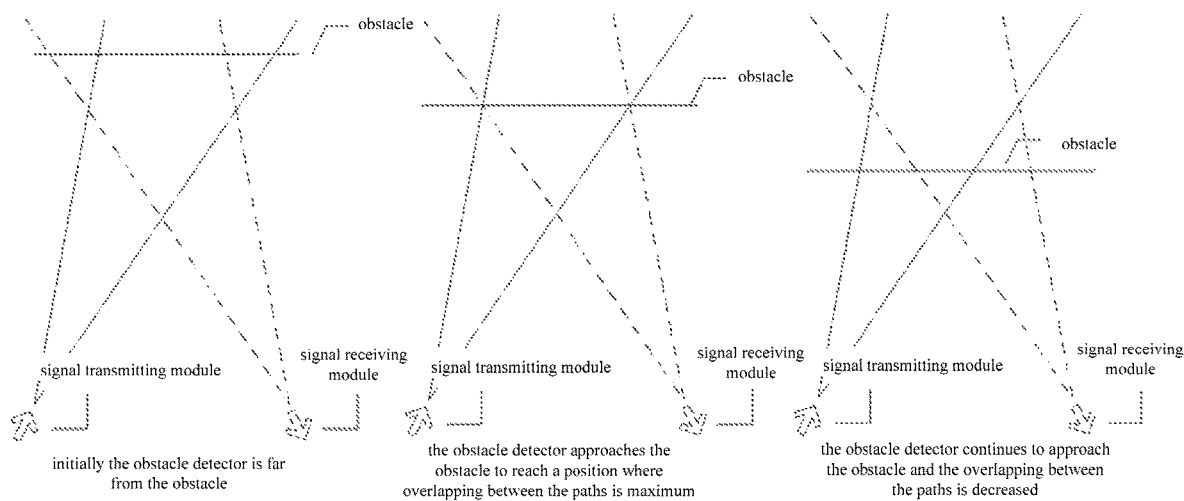
FIG. 5 is a schematic diagram illustrating a working principle of an obstacle detector according to an embodiment of the present disclosure.

In an embodiment of the present disclosure, the obstacle detector includes a signal transmitting device and a signal receiving device which are arranged according to a pre-set angle and a pre-set distance. The signal transmitting device radiates a first signal outward, and the signal receiving device receives a second signal sent back from the obstacle after the first signal is transmitted to the obstacle. FIG. 5 is a schematic diagram illustrating a working principle of an obstacle detector according to an embodiment of the present disclosure. As shown in FIG. 5, the signal transmitting device radiates a first signal outward, to form a first path between the signal transmitting device and the obstacle. The second signal forms a second path between the signal receiving device and the obstacle, and further convers into the detection data of the obstacle detector. In FIG. 5, a solid line refers to the first path formed by the first signal and a dotted line refers to the second path formed by the second signal.

In block 102, it is determined according to the detection data whether a distance between the cleaning robot and an obstacle reaches a first distance, where the first distance is a distance between the cleaning robot and the obstacle at a moment when a changing trend of the detection data fits a pre-set changing trend.

In an embodiment of the present disclosure, the detection data includes the second signal reflected off the obstacle. After the detection data is acquired, the detection data is further analyzed, to identify a changing trend during the cleaning robot approaching the obstacle. In this embodiment, if the changing trend of the detection data fits a pre-set changing trend, the distance between the cleaning robot and the obstacle is determined as the first distance.

With the distance detection method for a cleaning robot provided in the embodiments of the present disclosure, it is precisely detected whether the cleaning robot is moving to a specific position a certain distance away from the obstacle. As the specific position is determined precisely, collision with obstacles can be avoided efficiently for the cleaning robot during working, and thus the distance detection method for the cleaning robot is improved.

In the embodiments of the present disclosure, after the full detection in the moving direction of the cleaning robot is realized by different obstacle detector arrangements, the distance between the cleaning robot and the obstacle should be controlled to a certain degree according to the detection data. Specifically, a step of determining, according to the detection data, whether the distance between the cleaning robot and the obstacle reaches the first distance includes following steps.

In block 201, the second signal is extracted from the detection data, the second signal detected in a period that the cleaning robot is moving is analyzed, and a changing trend of a signal intensity of the second signal is acquired.

In block 202, it is determined whether the changing trend fits the pre-set changing trend.

In block 203, a distance between the cleaning robot and the obstacle at a current moment is acquired if the changing trend is determined to fit the pre-set changing trend, where the distance at the current moment is the first distance.

The detection data includes a second signal. After the second signal is extracted from the detection data, the signal intensity of the second signal is acquired according to reception time of the second signal. Then, the changing trend is identified to determine whether it fits the pre-set changing trend that the signal intensity is increased first and then decreased. If the identified changing trend fits the pre-set changing trend, according to the signal intensity at the current moment, a corresponding distance between the cleaning robot and the obstacle at the current moment is acquired.

Specifically, the current moment is a moment when the signal intensity of the second signal is determined to be decreased. It is known from the above that when the signal intensity of the second signal is a maximum, the distance between the cleaning robot and the obstacle is the first distance, that is, the distance between the cleaning robot and the obstacle at the current moment is the first distance.

Further, when it is determined that the changing trend of the second signal fits the pre-set changing trend, the distance between the cleaning robot and the obstacle at the current moment is acquired, such a step includes: acquiring the distance between the cleaning robot and the obstacle at the current moment according to the signal intensity of the second signal at the current moment.

Specifically, the signal intensity of the second signal has a one to one corresponding relationship with the distance between the cleaning robot and the obstacle (i.e., the first distance), that is, a different signal intensity of the second signal corresponds to a different distance value, and the distance value is the distance between the cleaning robot and the obstacle. The corresponding relationship is acquired by means of experimental acquisition during the development process of the cleaning robot. After an intensity of the second signal at the current moment is acquired, the distance between the cleaning robot and the obstacle can be acquired by querying the corresponding relationship.

The above content is further explained with reference to FIG. 5. Angle and distance between the signal transmitting device and the signal receiving device in the figure can be pre-set and the overlapping area between the two paths is increase first and then decreased. Specifically, during the process of the cleaning robot gradually approaching the obstacle from a distance, since the overlapping area between the first path and the second path is increased first and then decreased, that is, an area of the obstacle surface reflecting the first signal is first increased and then decreased as the cleaning robot approaches the obstacle, the signal intensity of the second signal is increased first and then decreased as the cleaning robot approaches the obstacle. Specifically, the larger the area of the obstacle surface reflecting the first signal is, the higher the intensity of the second signal generated by the reflection of the first signal is, otherwise, the lower the intensity of the second signal is. When the cleaning robot is at a certain distance from the obstacle, the overlapping area reaches a maximum and will start to be decrease as the cleaning robot further approaches. At this time, a maximum signal intensity of the second signal is acquired, and the certain distance is the first distance between the cleaning robot and the obstacle.

With the distance detection method for a cleaning robot provided in the embodiments of the present disclosure, it is precisely detected whether the cleaning robot is moving to a specific position a certain distance away from the obstacle. As the specific position is determined precisely, collision with obstacles can be avoided efficiently for the cleaning robot during working, and thus the distance detection method for the cleaning robot is improved.

In the embodiments of the present disclosure, different obstacle detector arrangements as described above may be selected in different conditions, and a specific selection principle is as follows.

When the cleaning robot is moving in a direction perpendicular to the obstacle, the first obstacle detector is able to complete the corresponding detecting work.

Figure 6:
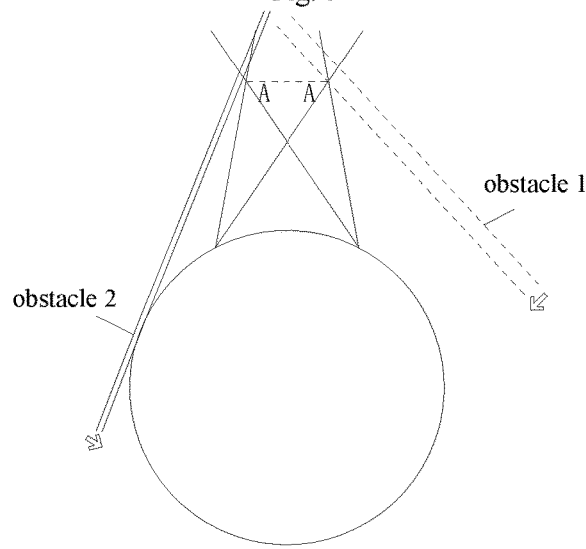
FIG. 6 is a schematic diagram illustrating a detection range of an obstacle detector according to an embodiment of the present disclosure.

When the moving direction of the cleaning robot is not perpendicular to the obstacle, two situations may happen. In one situation, the acute angle between the moving direction of the cleaning robot and the obstacle is relatively large, as shown in FIG. 6, the obstacle is an obstacle 1 represented by the dotted line. During the cleaning robot approaching the obstacle 1, the overlapping area formed by the first signal and the second signal is increased first and then decreased. After the point A, the overlapping area becomes smaller, and the signal intensity of the second signal also becomes smaller, that is, the first distance is reached when the obstacle reaches the point A. At this time, the cleaning robot is close to the obstacle, but does not collide with the obstacle, and thus the cleaning robot can stop normally. In this case, the first obstacle detector is enough to complete the corresponding detecting work. In another situation, the acute angle between the moving direction of the cleaning robot and the obstacle is relatively small, as shown in FIG. 6, the obstacle is an obstacle 2 represented by the solid line. As the cleaning robot approaches the obstacle, the overlapping area is increased. However, before the obstacle passes the point A, the cleaning robot may have collided with the obstacle. In this case the first obstacle detector cannot realize the distance control of the obstacle at that angle. Therefore, the second obstacle detector and the third obstacle detector are required to be disposed at the two sides of the cleaning robot.

Alternatively, in the case that the first obstacle detector is unable to perform the detection, a minimum of the signal intensity of the second signal may be set to realize a switch from the first obstacle detector being working to the second and third obstacle detectors being working. As shown in FIG. 6, a signal intensity of the second signal corresponding to a case where the obstacle passes the point A and is tangential to the cleaning robot is a minimum signal intensity threshold that the cleaning robot is able to stop by itself. When the signal intensity of the second signal is detected to be decreased to such a threshold, the first obstacle detector stops working immediately, and the second obstacle detector and the third obstacle detector are turned on. Specifically, a detector that has not received any obstacle information within a certain period is turned off, and another detector may continuously detect the obstacle.

Alternatively, the obstacle detector may be switched to continue the detection without determining whether the first obstacle detector is feasible or not. All obstacle detectors may be turned on. If an acute angle between the detection axis of an obstacle detector and the obstacle is closer to 0°, the first distance will be reached sooner for such an obstacle detector, and the signal intensity of the second signal will be higher when the first distance is reached. According to this principle, considering the changing trends of the signal intensities of the second signals collected by all obstacle detectors, when any of the signal intensities starts to decrease, the cleaning robot stops moving, so that the current first distance of the cleaning robot is as close as possible to an optimal distance of the cleaning robot from the obstacle. Specifically, the optimal distance is the first distance when the moving direction of the cleaning robot is perpendicular to the obstacle. At such a first distance, the cleaning robot stops at the farthest distance from the obstacle, thus efficiently prevent the cleaning robot from colliding with the obstacle.

Further, when only the second obstacle detector and the third obstacle detector are located at the two sides of the body of the cleaning robot, the two obstacle detectors may be activated once at a pre-set time interval, where a product of the time length of the interval and a speed of the cleaning robot is less than a distance from detection of the obstacle to the collision with the obstacle in any case, to detect whether there is an obstacle in front. As shown in FIG. 5, the overlapping of the paths may be decreased or even disappear as the distance between the cleaning robot and the obstacle is increased, and the obstacle detector has a limited detection direction. If no obstacle is detected within the detection distance, the obstacle detector will be turned off again and wait for the pre-set time interval to restart the detection. When an obstacle is detected in the detection range, the obstacle detector remains working for continuous detection until the cleaning robot reaches the first distance from the obstacle and then be turned off.

Specifically, when both the second obstacle detector and the third obstacle detector detect an obstacle, the changing trends of the signal intensities of the second signals of both detectors are acquired. If any of the signal intensities starts to decrease, it is determined that the cleaning robot arrives at the first distance from the obstacle and stops moving. Specifically, when the signal intensities of the second signals of the two detectors are the same, it is determined that the obstacle is perpendicular to the moving direction of the cleaning robot.

Figure 7:
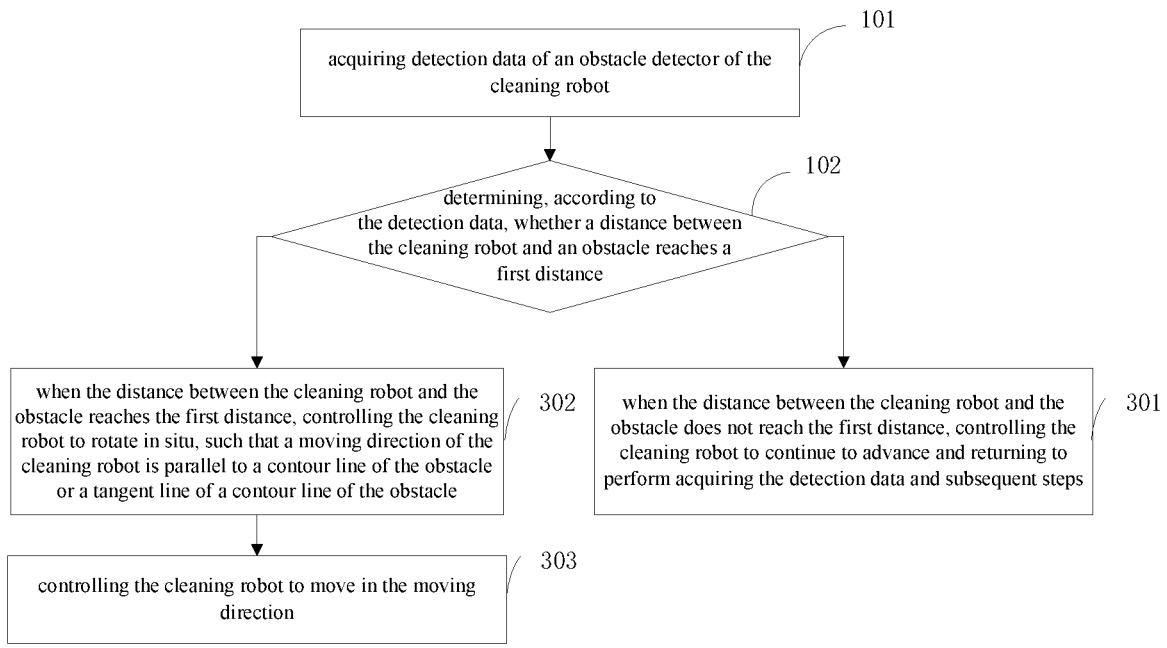
FIG. 7 is a flow chart of a distance detection method for a cleaning robot according to another embodiment of the present disclosure.

During the cleaning robot approaching the obstacle, the obstacle detector can detect the distance between the cleaning robot and the obstacle in real time, to enable the cleaning root to stop once reaching the first distance. After this, the cleaning robot needs to change its moving direction to continue to work to avoid collision with the obstacle. FIG. 7 is a flow chart of a distance detection method for a cleaning robot according to another embodiment of the present disclosure. As shown in FIG. 7, in order to solve the above problem, the following steps are included.

In block 301, when the distance between the cleaning robot and the obstacle does not reach the first distance, the cleaning robot is controlled to continue to advance and it is returned to perform the step of acquiring the detection data and subsequent steps.

Specifically, when the distance between the cleaning robot and the obstacle does not reach the first distance, that is, the signal intensity of the second signal has not yet reached a decreased point, the cleaning robot is controlled to continue to advance. Moreover, steps of acquiring detection data of an obstacle detector of the cleaning robot, and determining, according to the detection data, whether the distance between the cleaning robot and the obstacle reaches the first distance as described above are repeated until it is determined that the distance between the cleaning robot and the obstacle reaches the first distance.

In block 302, when the distance between the cleaning robot and the obstacle reaches the first distance, the cleaning robot is controlled to rotate in situ, and a moving direction of the cleaning robot is parallel to a contour line of the obstacle or a tangent line of a contour line of the obstacle.

In block 303, the cleaning robot is controlled to move in the moving direction, and the distance between the cleaning robot and the obstacle during the moving is controlled to be maintained within a pre-set distance range.

Figure 8:
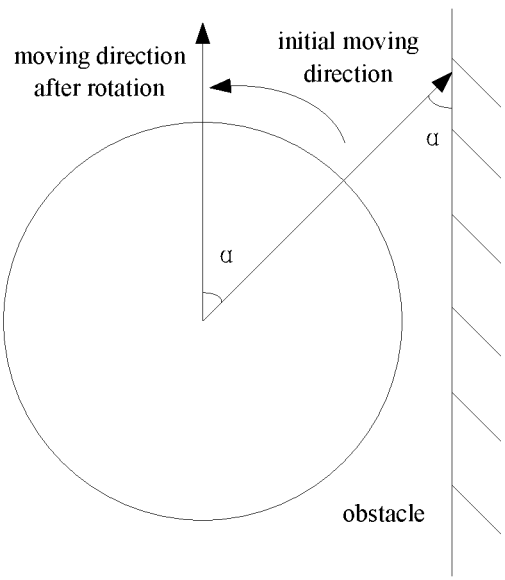
FIG. 8 is a schematic diagram illustrating in-situ rotation of a cleaning robot when a first distance is reached according to an embodiment of the present disclosure.

Specifically, the steps of acquiring detection data of an obstacle detector of the cleaning robot, and determining, according to the detection data, whether the distance between the cleaning robot and the obstacle reaches the first distance as described above are repeated. When it is determined that the distance between the cleaning robot and the obstacle reaches the first distance, the cleaning robot is controlled to stop, and it is determined according to identifier information of an obstacle detector of the detection data whether the cleaning robot should rotate clockwise or counter clockwise in situ. Specifically, a way to decide a rotation direction of the cleaning robot in situ according to the identifier information of the obstacle detector will be described in detail below and thus is not described here. Meanwhile, as shown in FIG. 8, the cleaning robot is controlled to rotate, in a corresponding clockwise or counter clockwise direction, an angular displacement of an acute angle between the moving direction of the cleaning robot and the obstacle. As shown in FIG. 8, the moving direction after the rotation of the cleaning robot is parallel to the contour line of the obstacle or the tangent line thereof, so that the cleaning robot may continue to move along the direction parallel to the contour line of the obstacle or the tangent line thereof. Moreover, a distance sensor may be disposed at the two sides of the cleaning robot to monitor the distance between the cleaning robot and the obstacle during moving in real time, so that the distance between the cleaning robot and the obstacle during the moving is maintained within the pre-set distance range.

Further, when the moving direction the cleaning robot is perpendicular to the obstacle, it is difficult to determine whether the cleaning robot rotates in situ clockwise or counter clockwise. In this case, the rotation direction may be randomly selected, or the obstacle detectors on both sides of the body of the cleaning robot may be used to detect the surroundings to enable the cleaning robot to rotate to a side with fewer obstacles thus preventing the cleaning robot from collision with the obstacles and reducing times of adjustments of the moving direction of the cleaning robot during cleaning process.

In an embodiment of the present disclosure, the detection data further includes identifier information of an obstacle detector. By extracting the identifier information of the detector from the detection data, a general direction of an obstacle related to the obstacle detector may be determined as follows.

The identifier information of the detector is extracted from the detection data, and a target obstacle detector to which the detection data belongs is identified according to the identifier information.

Further, a relative positional relationship between the cleaning robot and the obstacle is determined according to a position where the target obstacle detector is disposed at the cleaning robot.

Specifically, the identifier information of the obstacle detector is extracted from the detection data, and the position where the obstacle detector is located is also considered. For example, when the detection data includes the identifier information of the second obstacle detector but does not include the identifier information of the third obstacle detector, it indicates that the current detection data is acquired by the second obstacle detector. For example, as shown in FIG. 4, the second obstacle detector is disposed at a front-left side of the cleaning robot, the cleaning robot thus can determine that the obstacle is in front-left of the cleaning robot. Moreover, when the claning root reaches the first distance from the obstacle, it stops and rotates clockwise in situ, and the cleaning robot may rotate a minimum angle to make the moving direction of the cleaning robot in consistency with the contour of the obstacle or the tangent line thereof.

Figure 9:
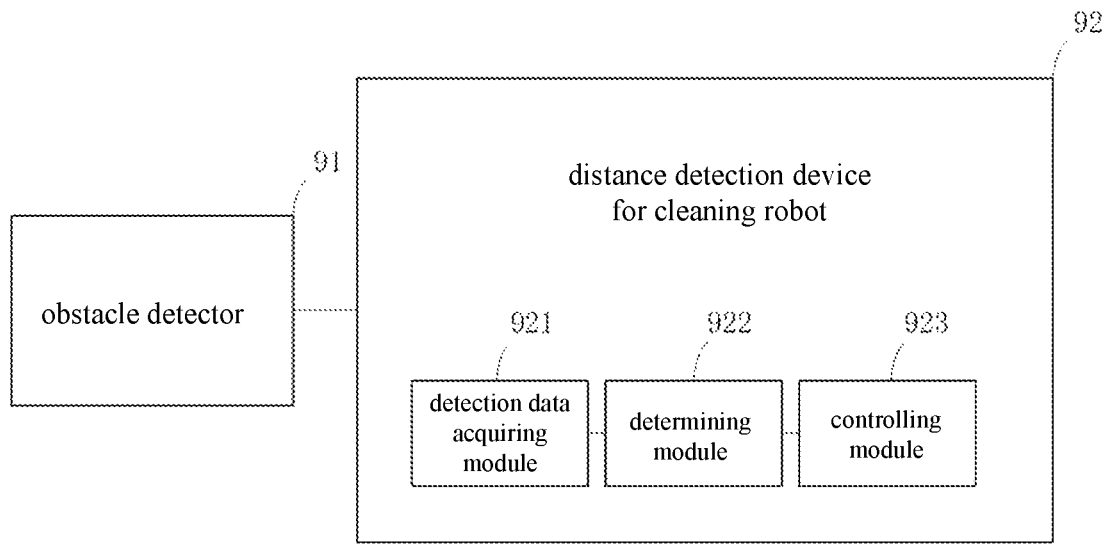
FIG. 9 is a block diagram of a distance detection device for a cleaning robot according to an embodiment of the present disclosure.

In order to realize the above embodiments, the present disclosure provides a distance detection device for a cleaning robot. FIG. 9 is a block diagram of a distance detection device for a cleaning robot according to an embodiment of the present disclosure. Specifically, an obstacle detector 91 and the distance detection device 92 are disposed at the cleaning robot. The obstacle detector 91 is configured to detect an obstacle, and the obstacle detector 91 is connected to the distance detection device 92.

Specifically, the distance detection device 92 includes: a detection data acquiring device 921 configured to acquire detection data of the obstacle detector of the cleaning robot, and a determining device 922 configured to determine, according to the detection data, whether a distance between the cleaning robot and an obstacle reaches a first distance, where the first distance is a distance between the cleaning robot and the obstacle at a moment when a changing trend of the detection data fits in a pre-set changing trend.

Specifically, each obstacle detector 91 includes a signal transmitting device and a signal receiving device, where the signal transmitting device and the signal receiving device are arranged according to pre-set angle and a pre-set distance, and an overlapping area exists between a first path and a second path, the first path being formed between the signal transmitting device and the obstacle and the second path being formed between the signal receiving device and the obstacle, and the overlapping area reaches a maximum when the distance between the cleaning robot and the obstacle reaches the first distance.

In some embodiments, the obstacle detector 91 includes a first obstacle detector disposed at a forward end of the cleaning robot.

In other embodiments, the obstacle detector 91 further includes a second obstacle detector and a third obstacle detector, and the second obstacle detector and the third obstacle detector are symmetrically disposed at two sides of a body of the cleaning robot.

Alternatively, the obstacle detector includes a second obstacle detector and a third obstacle detector, and the second obstacle detector and the third obstacle detector are symmetrically disposed at two sides of a body of the cleaning robot.

Specifically, the signal transmitting device included in the obstacle detector 91 is configured to radiate first signal outward, and the corresponding signal receiving device is configured to receive second signal sent back from the obstacle which the first signal is transmitted to the obstacle. The detection data includes the second signal.

The determining device 922 is configured to:

extract the second signal from the detection data, analyze the second signal detected in a period that the cleaning robot is moving, and acquire a changing trend of a signal intensity of the second signal, determine whether the changing trend is the pre-set changing trend, and acquire a distance between the cleaning robot and the obstacle at a current moment if the changing trend is determined as the pre-set changing trend, where the distance at the current moment is the first distance.

As the pre-set changing trend is that a signal intensity is increased first and then decreased, the determining device 922 is further configured to:

acquire the distance between the cleaning robot and the obstacle according to the signal intensity of the second signal at the current moment, where the current moment is a moment when the signal intensity of the second signal is determined to be decreased.

Further, the distance detection device 92 includes: a controlling device 923 connected to the determining device 922 and the detection data acquiring device 921.

Specifically, when the distance between the cleaning robot and the obstacle does not reach the first distance, the controlling device 923 is configured to control the cleaning robot to continue to advance and return to perform the process of acquiring the detection data and subsequent processes.

When the distance between the cleaning robot and the obstacle reaches the first distance, the controlling device is configured to control the cleaning robot to rotate in situ, and a moving direction of the cleaning robot is parallel to a boundary line of the obstacle or a tangent line of a boundary line of the obstacle, and control the cleaning robot to move in the moving direction.

Further, the controlling device 923 is further configured to:

extract identifier information of an obstacle detector from the detection data, and identify, according to the identifier information, a target obstacle detector to which the detection data belongs, and determine a relative positional relationship between the cleaning robot and the obstacle according to a position where the target obstacle detector is disposed at the cleaning robot.

Figure 10:
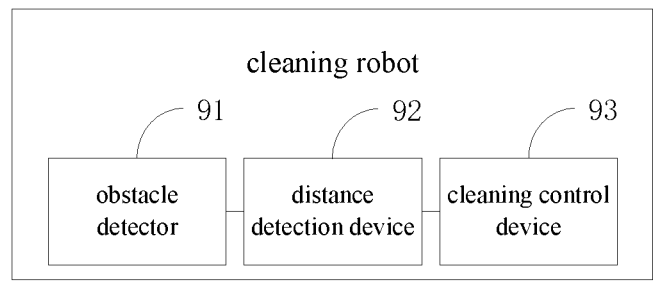
FIG. 10 is a block diagram of a cleaning robot according to an embodiment of the present disclosure.

In order to realize the above embodiments, the present disclosure provides a cleaning robot. FIG. 10 is a block diagram of a cleaning robot according to an embodiment of the present disclosure. As shown in FIG. 10, an obstacle detector 91, a distance detection device 92 as described above and a cleaning control device 93 are disposed at the cleaning robot. The distance detection device 92 is connected to the cleaning control device 93.

Specifically, the obstacle detector 91 is configured to detect an obstacle, and the cleaning control device 93 is configured to perform a cleaning operation.

Figure 11:
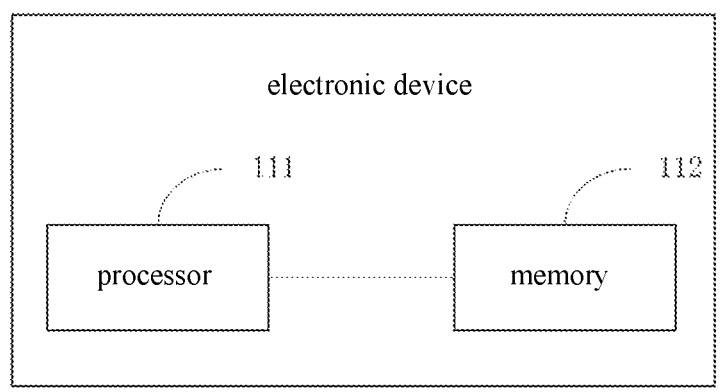
FIG. 11 is a block diagram of an electronic device according to an embodiment of the present disclosure.

In order to realize the above embodiments, the present disclosure provides an electronic device. FIG. 11 is a block diagram of an electronic device according to an embodiment of the present disclosure. As shown in FIG. 11, the electronic device includes a processor 111 and a memory 112.

Specifically, the processor 112 reads an executable program code stored in the memory 111 to execute a program corresponding to the executable program code, to perform a distance detection method for a cleaning robot as described in the above embodiments of the present disclosure.

In order to realize the above embodiments, the present disclosure provides a non-transitory computer readable storage medium having stored therein a computer program that, when executed by a processor, causes the processor to perform a distance detection method for a cleaning robot as described in the above embodiments of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counter clockwise", "axial", "radial" and "circumferential" should be construed to refer to the orientation as then described or as shown in the drawings under discussion. These relative terms are for convenience of description and do not require that the present disclosure be constructed or operated in a particular orientation, and thus shall not be construed to limit the present disclosure.

In addition, terms such as "first" and "second" are used herein for purposes of description and are not intended to indicate or imply relative importance or significance or to imply the number of indicated embodiments. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples

What is claimed is:

1. A distance detection method for a cleaning robot, comprising:
    acquiring detection data of an obstacle detector of the cleaning robot; and
    determining, according to the detection data, whether a distance between the cleaning robot and an obstacle reaches a first distance, wherein the first distance is a distance between the cleaning robot and the obstacle at a moment when a changing trend of the detection data fits a pre-set changing trend;
    in determination that the distance between the cleaning robot and the obstacle does not reach the first distance, controlling the cleaning robot to continue to move and perform acquiring the detection data;
    in determination that the distance between the cleaning robot and the obstacle reaches the first distance, controlling the cleaning robot to stop moving;
    determining the cleaning robot to rotate clockwise or counterclockwise according to identifier information of the obstacle detector contained in the detection data;
    controlling the cleaning robot to rotate in situ until a moving direction of the cleaning robot is parallel to a contour line of the obstacle or a tangent line of the contour line of the obstacle, and
    controlling the cleaning robot to move in the moving direction and keep the distance between the cleaning robot and the obstacle during the moving within a pre-set distance range;
    wherein the determining the cleaning robot to rotate clockwise or counterclockwise according to identifier information of the obstacle detector contained in the detection data further comprises:
    extracting the identifier information of the detector from the detection data, and identifying a target obstacle detector according to the identifier information;
    determining a relative positional relationship between the cleaning robot and the obstacle according to a position of the target obstacle detector on the cleaning robot; and
    determining the cleaning robot to rotate clockwise or counterclockwise according to the relative positional relationship between the cleaning robot and the obstacle.

2. The method according to claim 1, wherein the obstacle detector comprises a signal transmitting device and a signal receiving device, wherein the signal transmitting device and the signal receiving device are arranged according to a pre-set angle and a pre-set distance, wherein an overlapping area exists between a first path and a second path, the first path being formed between the signal transmitting device and the obstacle and the second path being formed between the signal receiving device and the obstacle, and the overlapping area reaches a maximum when the distance between the cleaning robot and the obstacle reaches the first distance.

3. The method according to claim 2, wherein the obstacle detector comprises a first obstacle detector disposed at a forward end of the cleaning robot.

4. The method according to claim 3, wherein the obstacle detector further comprises a second obstacle detector and a third obstacle detector, wherein the second obstacle detector and the third obstacle detector are symmetrically disposed at two sides of a body of the cleaning robot.

5. The method according to claim 2, wherein the obstacle detector comprises a second obstacle detector and a third obstacle detector, wherein the second obstacle detector and the third obstacle detector are symmetrically disposed at two sides of a body of the cleaning robot.

6. The method according to claim 2, wherein the signal transmitting device radiates a first signal outward, and the signal receiving device receives a second signal sent back from the obstacle after the first signal is transmitted to the obstacle; wherein the detection data comprises the second signal;
determining, according to the detection data, whether the distance between the cleaning robot and the obstacle reaches the first distance comprises:
extracting the second signal from the detection data, analyzing the second signal detected in a period that the cleaning robot is moving, and acquiring a changing trend of a signal intensity of the second signal,
determining whether the changing trend fits the pre-set changing trend, and
acquiring a distance between the cleaning robot and the obstacle at a current moment if the changing trend is determined to fit the pre-set changing trend, wherein the distance at the current moment is the first distance.

7. The method according to claim 6, wherein the pre-set changing trend is that a signal intensity is increased first and then decreased, and acquiring the distance between the cleaning robot and the obstacle at the current moment comprises:
acquiring the distance between the cleaning robot and the obstacle according to the signal intensity of the second signal at the current moment, wherein the current moment is a moment when the signal intensity of the second signal is determined to be decreased.

8. The method according to claim 1, further comprising:
extracting the identifier information of the obstacle detector from the detection data, and identifying, according to the identifier information, a target obstacle detector to which the detection data belongs, and
determining a relative positional relationship between the cleaning robot and the obstacle according to a position where the target obstacle detector is disposed at the cleaning robot.

9. An electronic device, comprising:
a memory,
a processor;
wherein the processor reads an executable program code stored in the memory to execute a program corresponding to the executable program code, so as to perform a distance detection method for a cleaning robot according to claim 1.

10. A non-transitory computer readable storage medium having stored therein a computer program that, when executed by a processor, causes the processor to perform a distance detection method for a cleaning robot according to claim 1.

11. The method according to claim 1, wherein the determining the cleaning robot to rotate clockwise or counterclockwise according to identifier information of the obstacle detector contained in the detection data further comprises:
detecting surroundings to enable the cleaning robot to rotate to a side with fewer obstacles.

12. A distance detection device for a cleaning robot, wherein an obstacle detector is disposed at the cleaning robot and is configured to detect an obstacle; the obstacle detector is connected to the distance detection device;
the distance detection device comprises:
a detection data acquiring device, configured to acquire detection data of the obstacle detector of the cleaning robot;
a determining device, configured to determine, according to the detection data, whether a distance between the cleaning robot and an obstacle reaches a first distance, wherein the first distance is a distance between the cleaning robot and the obstacle at a moment when a changing trend of the detection data fits in a pre-set changing trend; and
a controlling device connected to the determining device and the detection data acquiring device, wherein
in determination that the distance between the cleaning robot and the obstacle does not reach the first distance, the controlling device is configured to:
control the cleaning robot to continue to move and perform acquiring the detection data;
in determination that the distance between the cleaning robot and the obstacle reaches the first distance, the controlling device is configured to:
control the cleaning robot to stop moving;
determine the cleaning robot to rotate clockwise or counterclockwise according to identifier information of the obstacle detector contained in the detection data;
control the cleaning robot to rotate in situ until a moving direction of the cleaning robot is parallel to a contour line of the obstacle or a tangent line of the contour line of the obstacle, and
control the cleaning robot to move in the moving direction and keep the distance between the cleaning robot and the obstacle during the moving within a pre-set distance range;
wherein the determining the cleaning robot to rotate clockwise or counterclockwise according to identifier information of the obstacle detector contained in the detection data further comprises:
extracting the identifier information of the detector from the detection data, and identifying a target obstacle detector according to the identifier information;
determining a relative positional relationship between the cleaning robot and the obstacle according to a position of the target obstacle detector on the cleaning robot; and
determining the cleaning robot to rotate clockwise or counterclockwise according to the relative positional relationship between the cleaning robot and the obstacle.

13. The device according to claim 12, wherein the obstacle detector comprises a signal transmitting device and a signal receiving device, wherein the signal transmitting device and the signal receiving device are arranged according to pre-set angle and a pre-set distance, wherein an overlapping area exists between a first path and a second path, the first path being formed between the signal transmitting device and the obstacle and the second path being formed between the signal receiving device and the obstacle, and the overlapping area reaches a maximum when the distance between the cleaning robot and the obstacle reaches the first distance, wherein the obstacle detector comprises a first obstacle detector disposed at a forward end of the cleaning robot.

14. The device according to claim 13, wherein the obstacle detector further comprises a second obstacle detector and a third obstacle detector, wherein the second obstacle detector and the third obstacle detector are symmetrically disposed at two sides of a body of the cleaning robot.

15. The device according to claim 14, wherein the obstacle detector comprises a second obstacle detector and a third obstacle detector, wherein the second obstacle detector and the third obstacle detector are symmetrically disposed at two sides of a body of the cleaning robot.

16. The device according to claim 13, wherein the signal transmitting device is configured to radiate first signal outward, and the signal receiving device is configured to receive second signal sent back from the obstacle which the first signal is transmitted to the obstacle; wherein the detection data comprises the second signal;
the determining device is configured to:
extract the second signal from the detection data, analyze the second signal detected in a period that the cleaning robot is moving, and acquire a changing trend of a signal intensity of the second signal,
determine whether the changing trend is the pre-set changing trend, and
acquire a distance between the cleaning robot and the obstacle at a current moment if the changing trend is determined as the pre-set changing trend, wherein the distance at the current moment is the first distance.

17. The device according to claim 16, wherein the pre-set changing trend is that a signal intensity is increased first and then decreased, and the determining device is further configured to:
acquire the distance between the cleaning robot and the obstacle according to the signal intensity of the second signal at the current moment, wherein the current moment is a moment when the signal intensity of the second signal is determined to be decreased.

18. The device according to claim 12, further comprising:
extracting the identifier information of the obstacle detector from the detection data, and identifying, according to the identifier information, a target obstacle detector to which the detection data belongs, and
determining a relative positional relationship between the cleaning robot and the obstacle according to a position where the target obstacle detector is disposed at the cleaning robot.

19. A cleaning robot, comprising:
an obstacle detector, a cleaning device and a distance detection device according to claim 12 which are disposed at the cleaning robot, wherein the obstacle detector is connected to the cleaning device and the distance detection device, and the distance detection device is connected to the cleaning device;
wherein the obstacle detector is configured to detect an obstacle, and the cleaning device is configured to perform a cleaning operation.

* * * * *